US009169587B2

(12) United States Patent
Liang et al.

(10) Patent No.: US 9,169,587 B2

(45) Date of Patent: *Oct. 27, 2015

(54) PROCESS FOR MANUFACTURING MESH BAGS FROM A ROLL OF CONTINUOUS MESH TUBE

(71) Applicants: Hsiehyueh Wang Liang, Castro Valley, CA (US); Chen Chun Chris Liang, Castro Valley, CA (US)

(72) Inventors: Hsiehyueh Wang Liang, Castro Valley, CA (US); Chen Chun Chris Liang, Castro Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,984

(22) Filed: Jan. 21, 2014

(65) Prior Publication Data

US 2014/0130958 A1 May 15, 2014

Related U.S. Application Data

(62) Division of application No. 13/543,790, filed on Jul. 7, 2012, now abandoned.

(51) Int. Cl.

| | |
|---|---|
| ***B32B 37/00*** | (2006.01) |
| ***D05B 13/00*** | (2006.01) |
| ***B65D 33/28*** | (2006.01) |
| ***B65D 30/06*** | (2006.01) |
| ***B31B 1/00*** | (2006.01) |
| ***B65C 5/02*** | (2006.01) |
| ***B65D 30/00*** | (2006.01) |

(52) U.S. Cl.

CPC . *D05B 13/00* (2013.01); *B31B 1/00* (2013.01); *B65C 5/02* (2013.01); *B65D 29/00* (2013.01); *B65D 29/04* (2013.01); *B65D 33/28* (2013.01); *B31B 2219/022* (2013.01); *B31B 2219/23* (2013.01); *B31B 2219/9006* (2013.01); *B31B 2219/9032* (2013.01); *B31B 2219/9035* (2013.01); *B31B 2237/05* (2013.01); *B31B 2237/10* (2013.01); *B65D 2203/02* (2013.01)

(58) Field of Classification Search

CPC ...... B29C 65/10; B29C 65/52; B29C 65/524; B29C 65/5057; B29C 66/4722; B29C 66/63; B29C 66/83413; B65B 51/20

USPC ............... 156/91, 92, 93, 250, 269, 510, 513, 156/543, 547, 555, 580, 582

See application file for complete search history.

(56) References Cited

U.S. PATENT DOCUMENTS

| | | | | |
|---|---|---|---|---|
| 5,823,683 | A * | 10/1998 | Antonacci et al. | 383/107 |
| 6,761,012 | B2 * | 7/2004 | Rusert et al. | 53/410 |
| 7,931,064 | B2 * | 4/2011 | Liang | 156/499 |
| 8,025,757 | B1 * | 9/2011 | Liang | 156/322 |

* cited by examiner

*Primary Examiner* — James Sells

(74) *Attorney, Agent, or Firm* — Dahyee Law Group; Leon E. Jew

(57) ABSTRACT

The present invention teaches a new process for manufacturing mesh bags using a tube cloth. The process involve supplying a continuous tube cloth and at least one band with preprinted labels, propping up the tube cloth with a dynamic guiding assembly, attaching the preprinted labels to the tube cloth using hot melted adhesive or heat sealing methods and manufacturing a product from the tube cloth with the horizontal preprinted labels, and attaching plastic film to the tube mesh cloth.

10 Claims, 15 Drawing Sheets

PROCESS FOR MANUFACTURING MESH BAGS FROM A ROLL OF CONTINUOUS MESH TUBE

CROSS REFERENCE TO RELATED APPLICATIONS

This application is a divisional application of U.S. patent application Ser. No. 13/543,790, filed on Jul. 7, 2012, now issued as U.S. Pat. No. 8,025,757, which is a continuation-in-part of and claims the benefit of priority to U.S. patent application Ser. No. 11/893,196, entitled "Tube mesh bag, and apparatus and method for manufacturing the same," filed on Aug. 15, 2007, now issued as U.S. Pat. No. 7,931,064, and is a continuation-in-part of and claims the benefit of priority to U.S. patent application Ser. No. 12/930,723, entitled "Method for manufacturing tube mesh bag," which is a divisional application of and in turn claims the benefit of priority to U.S. patent application Ser. No. 11/893,196, the contents of which are incorporated in their entirety by reference herein.

TECHNICAL FIELD OF THE INVENTION

The present invention generally relates to the field of designing and manufacturing of packaging bags such as woven or mesh bags for containing onions, potatoes, citrus, nuts, fruits or other produce. More particularly, this invention is related to a machine assembly and process for manufacturing mesh bags from plastic tube cloth or mesh tube and the products manufactured by such process.

BACKGROUND OF THE INVENTION

Mesh bags have been widely used in commercial packaging and storing, laundry as well as sports. More particularly, light weight and heavy duty mesh bags are widely used for packaging and storing fruits, nuts, onions, garlic, and etc. As with other containers of consumer products, labeling is needed to give notice of the brand of the product as well as to convey other relevant information. The prior art's solutions for labeling are inferior to the present invention because they are lacking either in visibility, cost effectiveness or aesthetics.

Prior art labeling methods on tube mesh included stitching the preprinted label on or tying it on. These methods are aesthetically lacking and/or are easily torn off or damaged in transport since they are only attached at one or two edges of the label.

Adhesive preprinted label is an aesthetic improvement since the label is entirely bonded to the mesh bag and does not have portions of the label hanging off the bag or unbounded edges such as the stitched or tied prior art labels. Thus, this type of label is superior to the other prior art methods of labeling tube mesh bags.

Traditionally these adhesive preprinted labels were used only on bags made from sheets of mesh. The sheet of mesh would then need to be sealed on two sides to create an open bag and three sides to form a closed bag. On the other hand, mesh tube could be sealed on one side to form an open bag and two sides to be sealed for a closed bag resulting in lower production costs. If the self adhesive heat activated preprinted labels could be used with tube mesh, then a mesh bag can be made with all the advantages of using adhesive labels, along with the lower costs of using tube mesh.

FIG. 1A and FIG. 1B show a mesh bag according to the prior art, which was made from a sheet of mesh using adhesive labels. The adhesive labels are aesthetically superior to the other prior art labels and their size allows them to be easily read. These labels are primarily used on bags made from sheets of mesh rather than tube mesh since directly pressing the label onto a section of tube mesh would cause the other side of the tube stick to the label as well. But since sheets of mesh were used with this type of label, two sides of the mesh must be sealed to form an open bag. A closed bag would require three sides to be sealed. Each set of seals results in additional cost to the production of the bag.

FIG. 2A shows another prior art, which is a commonly known tube mesh woven cloth with a label printed on it. A vertical fine woven cloth is placed in the woven cloth and texts or graphs will be printed directly to the fine woven cloth. However, since the surface of the woven mesh cloth is uneven, the print would be crude and of low resolution when printing on the woven mesh cloth. Print of such normal quality cannot compete in the ever-competitive era and can't meet the current needs.

Yet FIG. 2B shows another prior art, which is a plastic tube mesh bag manufactured by a typical method of the following steps. The tube mesh cloth is first cut to the needed length. Then, on one end of the cloth, the cloth is folded to form a rim and a line is sewn on it to form the bottom of the bag. Finally, on the other end of the cloth, a sewing machine is used to wrap the edge so that the cutting edge will not come loose. In order to seal the top of the bag, a manual task is needed to insert a drawstring to the top of the bag and tie it. Alternatively, the top of the bag can be folded to form a rim and a drawstring can be inserted into the rim and the rim can be sewed and the drawstring can be then tied. Either way, these manual steps will add a large amount of labor cost to the manufacturing process.

For making woven tube mesh bag, because the opposite sides are folded together, the process used for attaching preprinted labels to the sheets of mesh would not be effective. Due to the characteristics of its mesh pattern, the binding material will permeate to the opposite side and cause two opposite sides to be attached together. Since the two opposite sides cannot be separated, it is also impossible to attach a plastic film containing a drawstring to the woven tube mesh bag. In addition, when heating is applied, plastic woven tube mesh cloth will melt from heat. Therefore, when a heat hole punching process is applied, the opposite sides of the woven tube mesh cloth will stick together, rendering it unusable as a bag.

It is an object of the present invention to provide a machine assembly and process for manufacturing mesh bags from a roll of continuous mesh tube cloth by repeating operations of sewing a line of stitches across the mesh tube and cutting the mesh tube at a predetermined measurement.

It is another object of the present invention to provide a means for attaching preprinted labels to the mesh bags prior to the cutting operation.

It is a further object of the present invention to provide a means for attaching a plastic film, a section of plastic film tube including a drawstring therein, or a section of partially carved plastic film tube including a drawstring therein, to the mesh bags prior to the cutting operation.

It is still a further object of the present invention to provide a means for punching holes on the mesh bags prior to the cutting operation.

What is desired is an easy, fast and low cost process for manufacturing mesh bags from a continuous plastic tube cloth or tube mesh cloth and so that effective and useful products can be manufactured.

SUMMARY OF THE INVENTION

The present invention teaches an apparatus and process for manufacturing bags from a roll of continuous tube cloth. The process involves supplying a continuous tube cloth and attaching preprinted labels and strengthening films to the tube cloth before it is cut into bags. The tube cloth is knit, woven or inject molded. The tube cloth can be plastic tube cloth or tube mesh cloth. The tube cloth is propped up with a dynamic guiding assembly.

The dynamic guiding assembly includes a partition plate, a fixed seat, at least two retractable axles, at least one fixture and at least one moveable roller. The partition plate separates two opposite sides of the tube cloth. The preprinted labels are attached to the tube cloth with a medium material using high-frequency wave, hot melted adhesive, heat sealing or coating methods. The medium material is glue, hot adhesive vinyl or polyethylene. Since the two opposite sides of the tube cloth are separated by the partition plate, the other side is not affected by the medium material when the preprinted label is attached.

In another preferred embodiment of the invention, the process also includes a step of attaching a plastic film to the tube cloth. A drawstring is placed inside the plastic film.

The invention also teaches a plastic tube mesh bag with a preprinted label manufactured with above process. The plastic tube mesh bag includes a section of tube cloth, a preprinted label which is fixed on the cloth, a plastic film which is fixed to the top and bottom edges of the tube cloth, and a sewing line which is placed on the plastic film on the bottom of the tube cloth.

The dynamic guiding apparatus for propping up a tube cloth according to the invention includes a dynamic guiding assembly, which includes a flat partition plate, a fixed seat attached to the partition plate, at least two retractable axles which are on each side of the fixed seat, at least one fixture which grips the fixed seat and at least one moveable roller which is connected to the fixture. The partition plate is used to separate opposite sides of the tube cloth. The partition plate may have plural punching holes, which in coupling with the punchers of a hole-punching assembly, are used to make holes on the tube cloth separated by the partition plate. The tube cloth can be plastic tube cloth or tube mesh cloth. The retractable axles can be bearings.

The invention also teaches an apparatus for manufacturing mesh bags from a tube cloth. The apparatus includes: a continuous tube cloth, which is knit, woven or inject molded, and is plastic tube cloth or tube mesh cloth; at least one band with preprinted labels; a dynamic guiding assembly, which comprises a partition plate, a fixed seat, at least two retractable axles, at least one fixture and at least one moveable roller, where the partition plate separates two opposite sides of the tube cloth; a medium material using high-frequency wave, hot melted adhesive, heat sealing or coating methods, where the medium material is glue, hot adhesive vinyl or polyethylene. In operation, the tube cloth is propped up with the dynamic guiding assembly. The preprinted labels are attached to the tube cloth with the medium material using high-frequency wave, hot melted adhesive, heat sealing or coating methods. The tube cloth can be plastic tube cloth or tube mesh cloth. When attaching the preprinted labels to the tube cloth, since two opposite sides of the tube cloth is separated by the partition plate, the other side is not affected by the attaching means such as the heating or medium material. The apparatus may further include a film attaching assembly which is used to attach a plastic film to the mesh tube. The apparatus may further include a hole-punching assembly which is used to making holes on the filmed section of the mesh tube.

By using heat-punching process, the invention solves the problem that mesh cloth has loose ends at the edge after being cut. In addition, plastic films can be attached to the top and bottom edge of a section of the mesh tube. By attaching plastic films, the process of the invention prevents the loose ends at the edge and therefore reduces the cost of sealing the top of the bag. A drawstring can be placed or embedded in a film tube with an opening and then attaching the film tube to the top edge of the mesh tube section, and thus labor and associated cost for manufacturing mesh bags can be further reduced.

DETAILED DESCRIPTION OF THE INVENTION

Figure 1A:
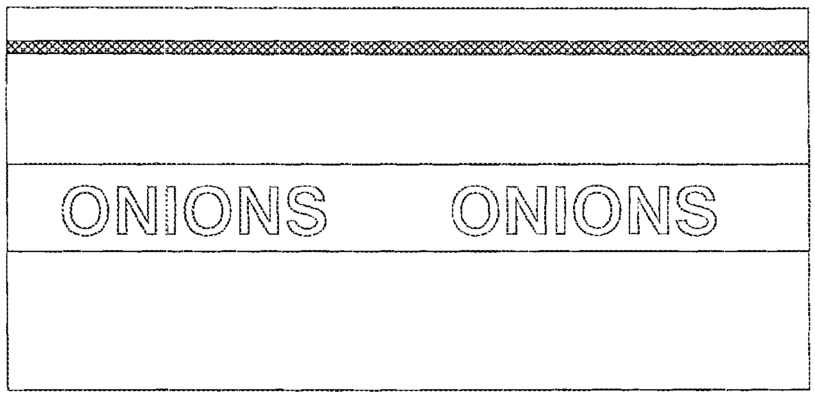
FIG. 1A (prior art)
FIG. 1A is a schematic diagram illustrating a sheet of woven mesh cloth according to the prior art.
Figure 1B:
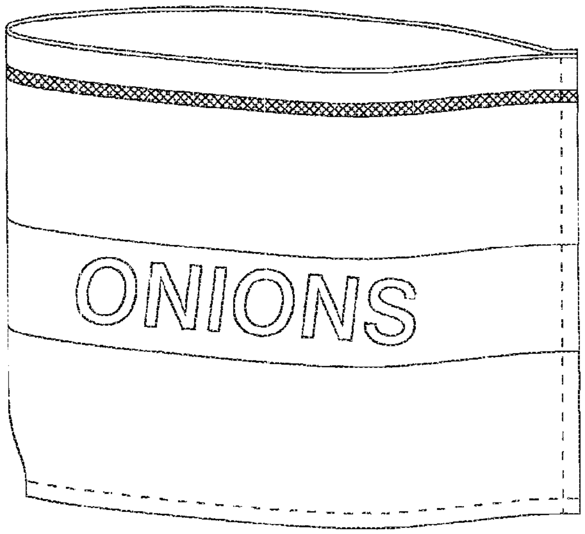
FIG. 1B (prior art)
FIG. 1B is a schematic diagram illustrating a mesh bag made from the sheet of woven mesh cloth according to FIG. 1A using a prior art method of folding and sewing.
Figure 2A:
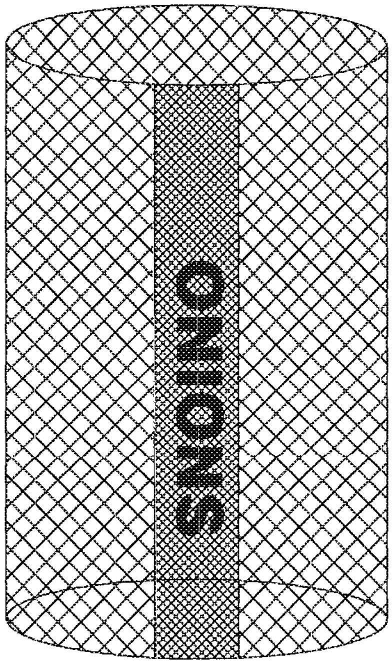
FIG. 2A (prior art)
FIG. 2A is a schematic diagram illustrating a woven tube mesh cloth according to another prior art.
Figure 2B:
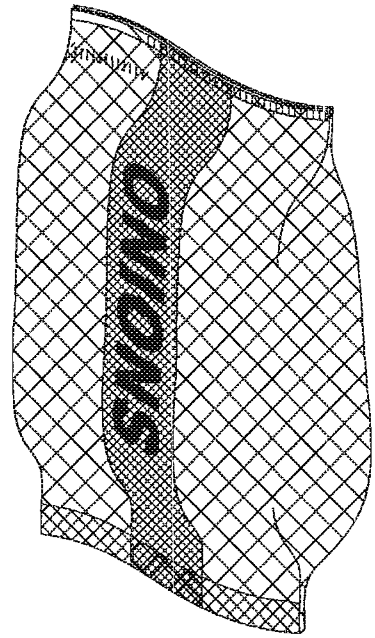
FIG. 2B (prior art)
FIG. 2B is a schematic diagram illustrating a mesh bag made from the woven tube mesh cloth according to FIG. 2B using the prior art method of folding and sewing.

While the present invention may be embodied in many different forms, designs or configurations, for the purpose of promoting an understanding of the principles of the invention, references will be made to the embodiments illustrated in the drawings and specific language will be used to describe the same. It will nevertheless be understood that no limitation or restriction of the scope of the invention is thereby intended. Any alterations and further implementations of the principles of the invention as described herein are contemplated as would normally occur to one skilled in the art to which the invention relates.

The preferred embodiment of the invention teaches a machine assembly (herein after as "apparatus") and a process for manufacturing mesh bags from a continuous tube mesh cloth (herein after as "mesh tube"). The tube mesh cloth is made of polyethylene or polypropylene. The process involves supplying a continuous mesh tube and at least one band of preprinted labels. The preprinted labels are made of polyethylene, polypropylene, OPP or CPP. The mesh tube is knit, woven or inject molded. It can be plastic tube cloth or other tube mesh material. In operation, the mesh tube enters the machine from one end and is propped up by a dynamic guiding assembly operatively installed in the apparatus. While the mesh tube pauses at a predetermined interval, a label attaching assembly attaches a preprinted label to the mesh tube by or under the label attaching assembly, and at the same time, a film attaching assembly attaches a plastic film to the mesh tube by or under the film attaching assembly, and a hole-punching assembly punches holes on the mesh tube by or under the hole-punching assembly. The hole-punching assembly is positioned according to the designed measurement of the mesh bag such that holes are punched on the section of mesh tube which was filmed in the immediate prior interval. Alternatively, the hole-punching assembly can be physically close to the film attaching assembly but its operation is configured right after the film attaching operation. In other words, during a same interval, the film attaching assembly attaches a plastic film on the mesh tube, and then the hole-punching assembly punches holes on the filmed section of the mesh tube.

The dynamic guiding assembly includes a flat partition plate of a square or rectangular shape, a fixed seat coupled to the partition plate, at least two retractable axles coupled to two sides of the fixed seat respectively, at least one moveable roller coupled to the fixed seat by a fixture. The partition plate is made from a heat resistant material such as silica gel, Teflon or Bakelite. In operation, the dynamic guiding assembly is first inserted into the mesh tube. When the mesh tube is passing through the apparatus, the partition plate separates two opposite sides of the mesh tube. The preprinted labels are attached to the tube cloth with a medium material using high-frequency wave, hot melted adhesive, heat sealing or coating methods. The medium material can be glue, hot adhesive vinyl or polyethylene. Since the two opposite sides of the mesh tube are separated by the partition plate, the other side is not affected by heating or binding when attaching the preprinted label to one side of the mesh tube.

The process according to the present invention may also include a step of attaching a plastic film to the mesh tube using a film attaching assembly. The plastic film has two functions. First, it strengthens the open end of the mesh bag. Second, it strengthens the sewing line which seals the closed end of the mesh bad. In the operation of the apparatus, after the plastic film is attached to the mesh tube by the film attaching assembly, the mesh tube is cut across the plastic film such that a part of the plastic film is used for the open end of one mesh bag, and another part of the plastic film is used for the closed end of another mesh bag. In one implementation of the invention, the plastic film can be a partially carved film tube wherein a drawstring is placed. After a segment of the mesh tube is cut, one end is sealed by a line of sewing stitches, and the other end is strengthened by the film tube which includes a drawstring. By pulling the drawstring, a user may easily tie up the mesh bag which is filled with items such as fruits.

The process according to the present invention may also include a step of using a hole-punching assembly to punch holes on the section of the mesh tube which was coated with a plastic film as described above. The punched holes are used for hanging on a packaging machine. They can also be used for holding a drawstring. For the hole punching purpose, the partition plate of the guiding assembly described above may have two punching holes which are operatively coupled with the hole-punching assembly. In the Now the embodiments of the present invention are illustrated in more details with references with the drawings. The machine assembly for manufacturing mesh bags from a roll of mesh tube according to the invention includes a machine frame, a number of guiding rollers which defines a passageway through which the mesh tube is transported from one end to another end of the machine assembly, and a dynamic guiding assembly which is coupled in the passageway. To drive the mesh tube's transportation, at least one of the guiding rollers is powered by a motor.

Figure 3:
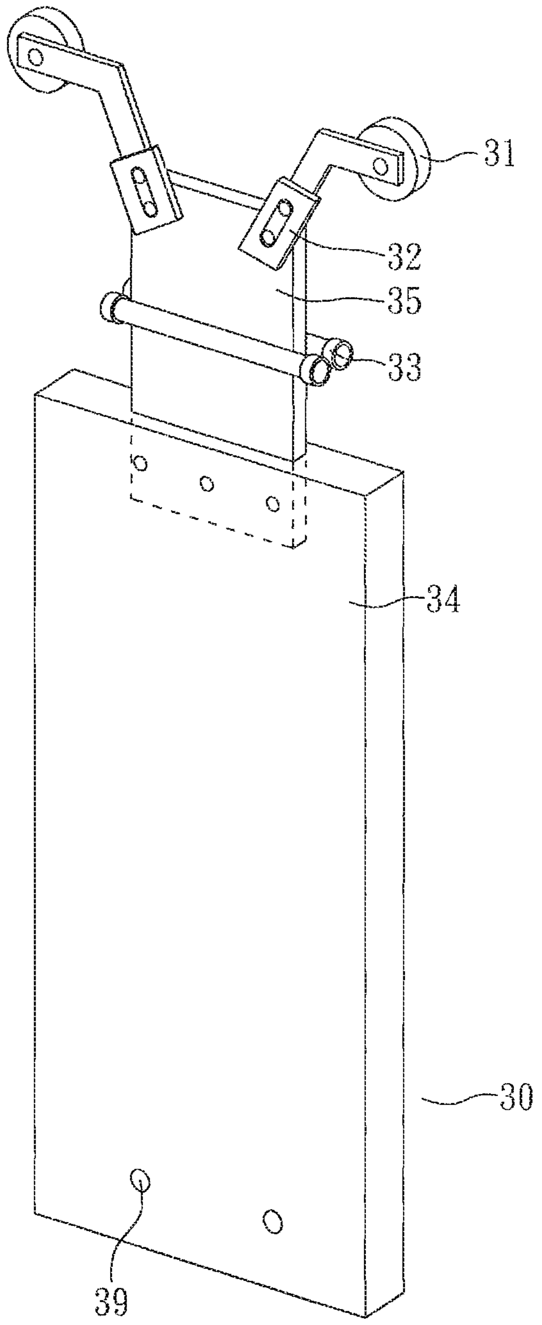
FIG. 3 is a schematic diagram illustrating a dynamic guiding assembly included in the machine assembly for making mesh bags from mesh tube according to a typical embodiment of present invention.

FIG. 3 is a schematic diagram illustrating a dynamic guiding assembly included in the machine assembly for making mesh bags from a roll of mesh tube according to a typical embodiment of present invention. The dynamic guiding assembly 30 includes a partition plate 34 which can be a flat metal plate in a square or rectangular shape, at least two retractable arms or axles 31 for propping up the mesh tube when the mesh tube is passing over the partition plate 34, at least one free spinning support roller 33 which allows the mesh tube 300 be transported smoothly with less friction and at the same time fixing the guiding assembly's relative position to the machine frame, at least one fixture 32 coupled to each of the retractable axles 31 for adjusting the axle's position, and a fixing member or fixed seat 35 for coupling the retractable axles 31, the fixture 32, the free spinning roller 33 and the partition plate 34 together. The guiding assembly 30 can be either installed vertically or horizontally depending on the implementation of the machine assembly. Although the guiding assembly 30 can have various different configurations, in most of the circumstances, it has at least two adjustable arms to prop up the mesh tube from the inside of the mesh tube. To decrease the sliding friction between the mesh tube and adjustable arms, a bearing is coupled to each arm's upper end. The arm's lower end is coupled to a fixing member 35. The arms are elastically extended outward through at least one sprint. The fixing member 35 couples the partition plate 34, the adjustable arms 31 and the at least free spinning support rollers 33 together. The arms 31 are adjusted by the fixtures 32. The holes 39 on the partition plate 34 are for coupling with a hole-punching assembly to make holes on the mesh bag.

Figure 4:
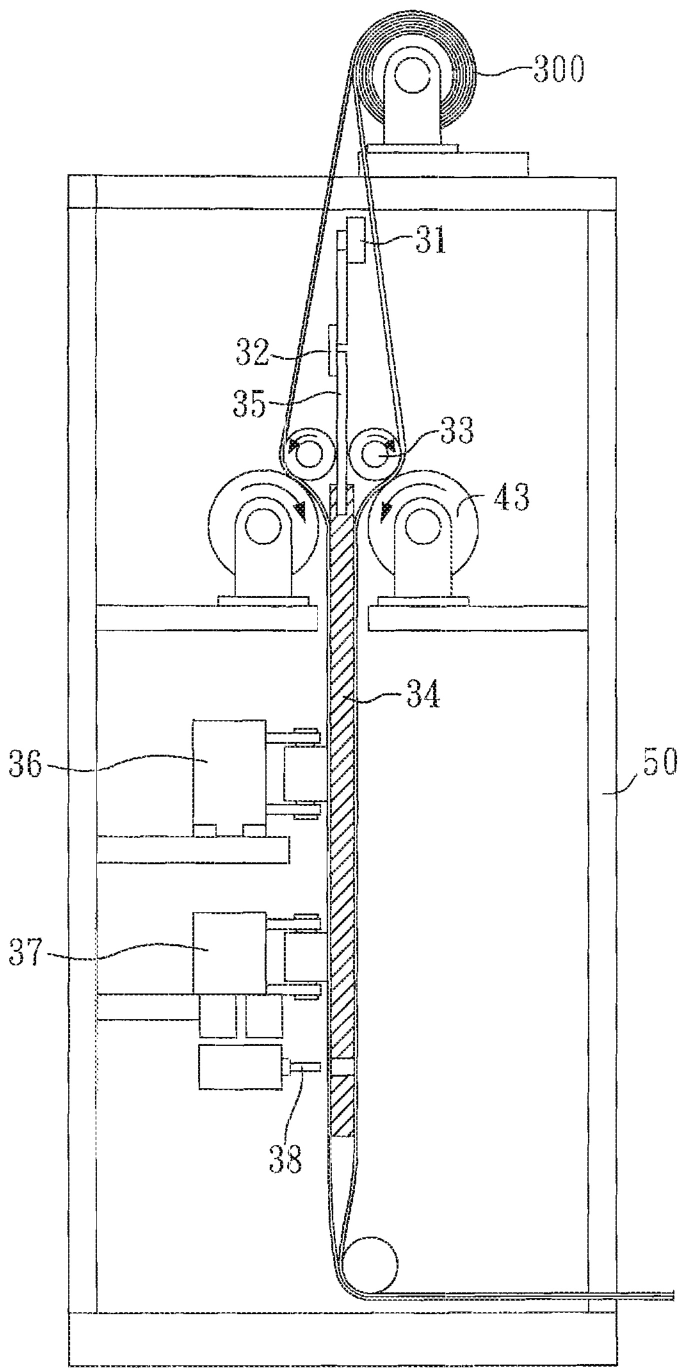
FIG. 4 is a schematic diagram illustrating a cross sectional view of the machine assembly for attaching preprinted label to a section of the mesh tube, attaching a plastic film to another section of the mesh tube and punching holes to the filmed section of the mesh tube, according to a typical embodiment of the present invention.

FIG. 4 is a schematic diagram of a cross sectional view of the machine assembly according to a typical embodiment of the present invention. The machine assembly, which is coupled with a machine frame 50, includes a label attaching means 36 for attaching preprinted label to a portion of the mesh tube, a film attaching means 37 for attaching a band of plastic film to another portion of the mesh tube and a hole punching means 38 for punching holes to the filmed portion of the mesh tube. In operation, a roll of continuous mesh tube cloth 300 is passing through the apparatus and is continuously propped up with the dynamic guiding assembly 30 which is placed in the passageway of the apparatus. In a horizontal implementation, the dynamic guiding assembly 30 can be placed on the machine frame, being dynamically coupled to the machine frame through rotating interaction between the guiding assembly's free spinning support roller 33 and at least one guiding roller 43 affixed to the machine frame. The guiding assembly 30 is placed or inserted into the mesh tube from its open end. Then, the apparatus drives the mesh tube to move forward and the mesh tube passes through the passageway of the guiding assembly which is dynamically coupled to the apparatus' frame through a number of rollers such as roller 33 and roller 43. The label attaching assembly 36 can be configured in such a manner that the preprinted labels are attached on the filmed portion of the mesh tube, i.e., the plastic film which is attached to the mesh tube by the film attaching assembly 36.

Figure 5:
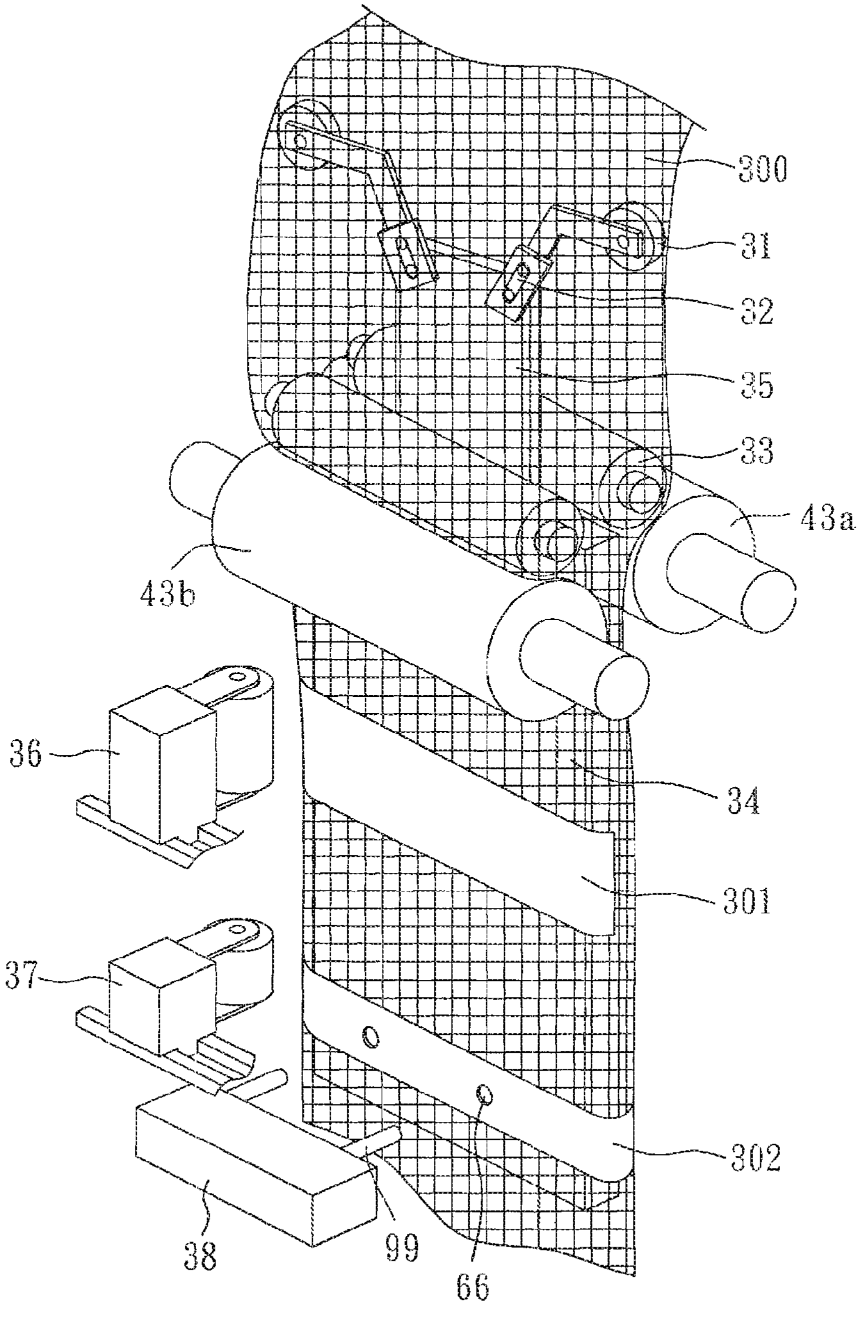
FIG. 5 is a schematic diagram illustrating an exploded perspective view of the inner parts of the machine of FIG. 4.

FIG. 5 is a schematic diagram illustrating a three dimensional exploded view of the inner components of the apparatus for manufacturing mesh bag according to the embodiment of present invention as illustrated in FIG. 4. The apparatus involves supplying a continuous mesh tube cloth 300, which is propped up with a dynamic guiding assembly 30 as illustrated in FIG. 3. The tube cloth 300 can be a plastic tube cloth or a tube mesh cloth. The apparatus includes a label attaching assembly 36 which is for attaching the preprinted label 301 to the tube cloth 300. It may further include a film attaching assembly 37 and a hole punching assembly 38. The guiding assembly 30 is operably coupled with the guiding rollers *43a* and *43b*. The mesh tube 300 is transported at a predetermined speed and pauses at predetermined intervals. During each of the paused interval, the label attaching assembly 36 attaches a preprinted label to one portion of the mesh tube which is separated by the guiding assembly from the inside, and the film attaching assembly 37 attaches a band of plastic film to one or both sides of the mesh tube which is separated by the guiding assembly from the inside, and the hole punching assembly 38 punches a pair of holes 66 on both sides of the mesh tube which is separated by the partition plate. The hole punching assembly 38 includes a pair of male cylindrical members 99 which can be operably coupled into a pair of through-holes 39 on the partition plate 34. In a finished mesh bag, the two holes are embedded in the film which is attached to the top edge of the mesh bag. The holes on the mesh bag are for hanging in a packaging machine which processes a large number of mesh bags. The film attached to the exterior of the mesh bag has two basic functions. First, it strengthens the mesh bag for hanging. Second, it enables the packaging machine to suck the mesh bag open before the items are filled in the mesh bag.

In operation, the tube cloth 300 passes over the dynamic guiding assembly 30 and through the inner pass defined by the guiding rollers *43a/43b* and the free spinning support rollers 33. The tube cloth 300 moves at a predetermined speed and pauses at predetermined intervals. During a paused interval, the attaching assembly 36, the film attaching assembly 37 and the hole-punching assembly 38 complete their operations respectively. In other words, while the tube cloth 300 stops, the label attaching assembly 36 attaches a preprinted label 301 to the tube cloth 300, the film attaching assembly 37 attaches a plastic film 302 to the tube cloth, and the hole punching assembly 38 punches two holes 66 on the film which was attached by the assembly 37 in the prior interval. The moving speed of the tube cloth 300, the interval, and the operations of the label attaching assembly 36, the film attaching assembly 37 and the hole punching assembly 38 are all controlled by an electronic controlling unit (not shown in FIG. 4 and FIG. 5). The mesh tube with labels, the plastic films and holes is then sewed and cut into mesh bags.

The physical distance between the label attaching assembly 36 and the film attaching assembly 37 is adjustable according to the required measurement of the mesh bag product. The distance between the film attaching assembly 37 and the hole punching assembly 38 is also adjustable according to the required measurement of the mesh bag product.

Alternatively, the film attaching operation and the hole punching operation can be completed in a same interval of the mesh tube's movement. In this type of implementation, the hole punching operation is performed immediately after the film attaching operation. For example, the continuous mesh tube stops for 1 second, and the film attaching operation takes ½ second, and the hole-punching operation takes ½ second.

Now referring back to FIG. 3, the partition plate 34 has two through-holes 39, which, in a hole-punching operation, allow the hole punching assembly 38 to punch two holes 66 on the filmed portion of the mesh tube 300. The hole punching assembly 38 has two male cylindrical members 99, also called punchers, which match with the through-holes 39 on the partition plate 34. The male member's diameter is slightly smaller than the diameter of the through-hole 39. To seal the edge of the punched holes 66 on the filmed mesh bag, heat is applied while the punchers 99 are punching into the through-holes 39. This feature is important because without heat application, the edge of the punched holes 66 would be loose or scattered due to the characteristics of the materials for the mesh tube. Since the two opposite sides of the tube cloth 300 are separated by the partition plate 34, the two sides will not be attached to each other in the label attaching operation, the film attaching operation and the hole punching operation. To clean up the fragments from the punching operation, a pair of pipes (not shown in the drawings) is installed in the other side of the mesh tube, each of pipes being positioned to face a through-hole 39. Immediately after the puncher 99 is punched into the through-hole 39, a fragment of the mesh material is pushed to the other side of the through-hole 39 and is then sucked into the pipe which is connected to a trash container. The sucking force is created by a pump which is a component of the apparatus.

The process according to the present invention involves driving the continuous tube cloth 300 with an external motor assembly or by at least one motor-powered guiding roller, which transports the tube cloth 300 at a preset fixed speed and predetermined pausing intervals. After a fixed distance, the tube cloth 300 is paused. During the paused interval, the label attaching assembly 36 attaches a preprinted label to the tube cloth 300, at the same time, the film attaching assembly 37 attaches a plastic film to the tube cloth 300, and the hole punching assembly 38 punching two holes on the plastic film which was attached during the prior pausing interval. The process is repeated in the next interval. In accordance with the specification of the mesh bag product, the plastic film can be a band of plastic film, a segment of plastic film tube with a drawstring included therein, or a segment of partially carved plastic film tube with a drawstring included therein.

Figure 6:
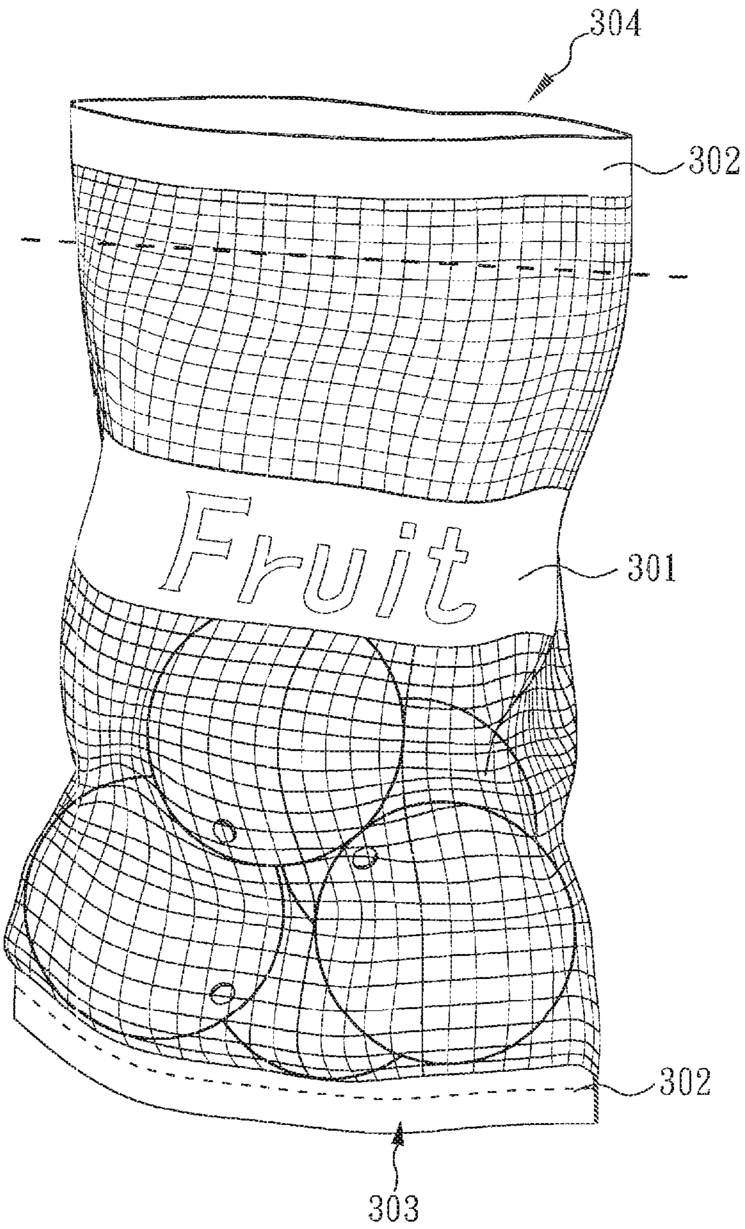
FIG. 6 is a schematic diagram illustrating a tube mesh bag which is made using the machine of FIG. 4, where a cut is made on each filmed section of the mesh tube and the tube mesh bag is made using a segment of the cut mesh tube with one end sealed with a line of stitches.

FIG. 6 is a schematic diagram illustrating a tube mesh bag 304 which is made using the apparatus of FIG. 4, where a cut is made on each filmed section of the mesh tube and the mesh bag is made using a segment of the cut mesh tube with one end sealed with a line of stitches 303. For manufacturing this type of mesh bags, the hole punching assembly 38 was not engaged. After the plastic film 302 and the preprinted label 301 are attached to a segment of the mesh tube, the apparatus stitches across the mesh tube and then cut the mesh tube into mesh bags. The sewing line 303 shows the stitches over the plastic film 302.

Figure 7A:
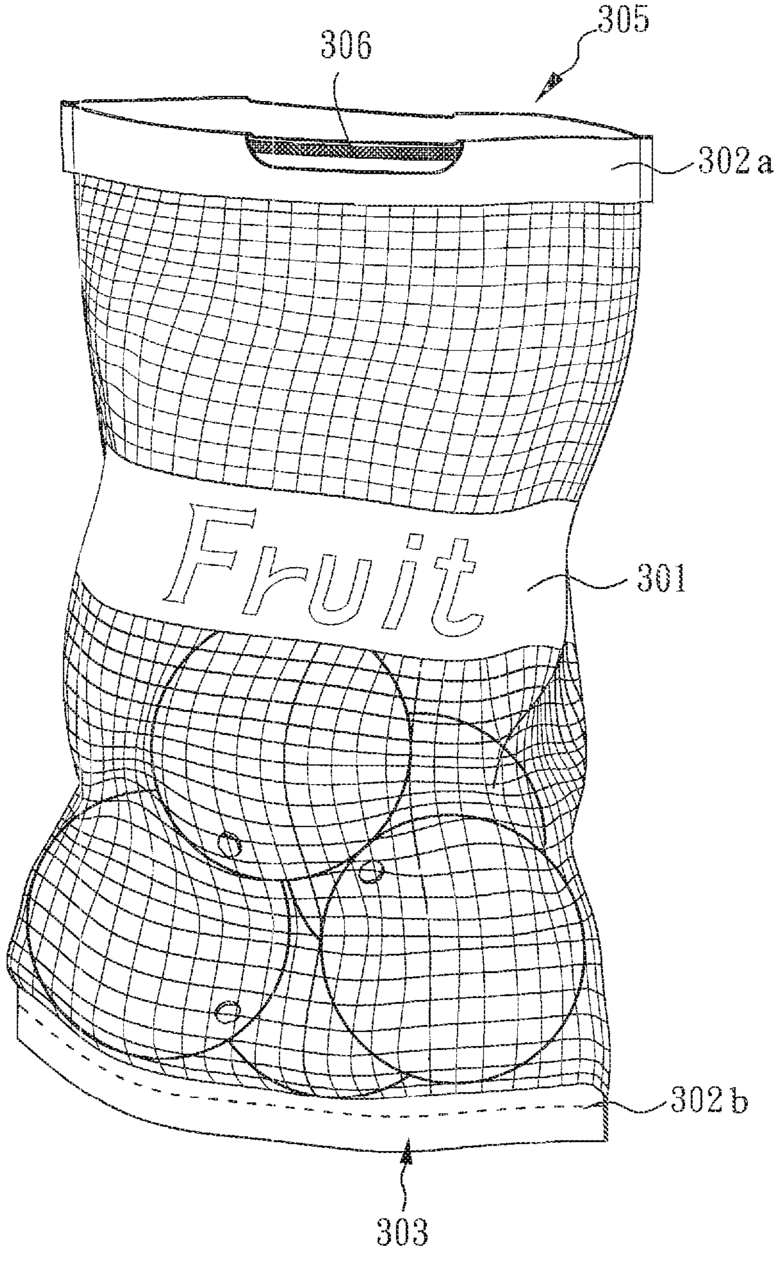
FIG. 7A is a schematic diagram illustrating a tube mesh bag which is made using the machine of FIG. 4, where film tube or sleeve for holding a drawstring is attached to the mesh tube and the tube mesh bag is made using a segment of the cut mesh tube with one end sealed with a line of stitches and with an open end strengthened with the film tube or sleeve for holding the drawstring.
Figure 7B:
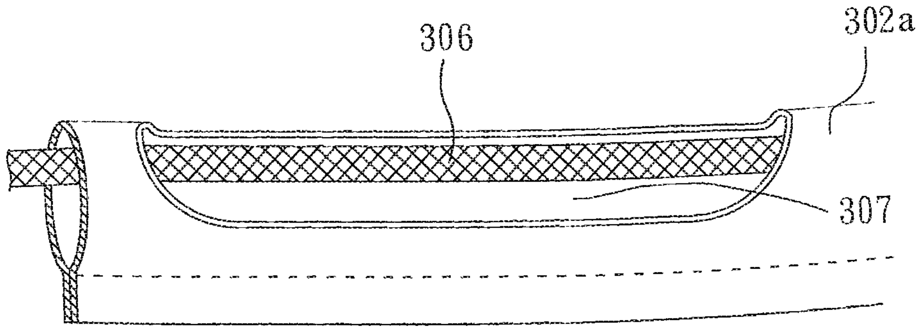
FIG. 7B is a schematic diagram illustrating a plastic tube film with a drawstring according to FIG. 7A.

FIG. 7A is a schematic diagram illustrating a mesh bag 305 which is manufactured by the apparatus and process according to another embodiment of the present invention. For manufacturing this mesh bag, the hole punching assembly 38 was not engaged. Instead, a pulling cord or drawstring 306 is preplaced in a plastic tube film 302*a*. The plastic tube film 302*a* is partially carved such that the drawstring 306 is partially exposed. After the plastic film 302*a* and the preprinted label 301 are attached to the mesh tube, the apparatus stitches across the mesh tube and then cut the mesh tube into mesh bags. The sewing line 303 shows the stitches over the plastic film 302*b*. The plastic film 302*a* is a plastic film tube with a pre-manufactured drawstring 306 placed inside. The drawstring 306 is fixed to the top portion of the mesh bag when the plastic film tube with drawstring therein is attached to the tube cloth, thus the drawstring 306 can be easily reached by a user. FIG. 7B is a schematic diagram illustrates the structure of the drawstring's placement in the plastic film tube 302*a*. The drawstring 306 is placed in the film tube 302. There is an opening 307 carved on the plastic film tube 302*a* such that the drawstring 306 is partially exposed to the user.

Figure 8:
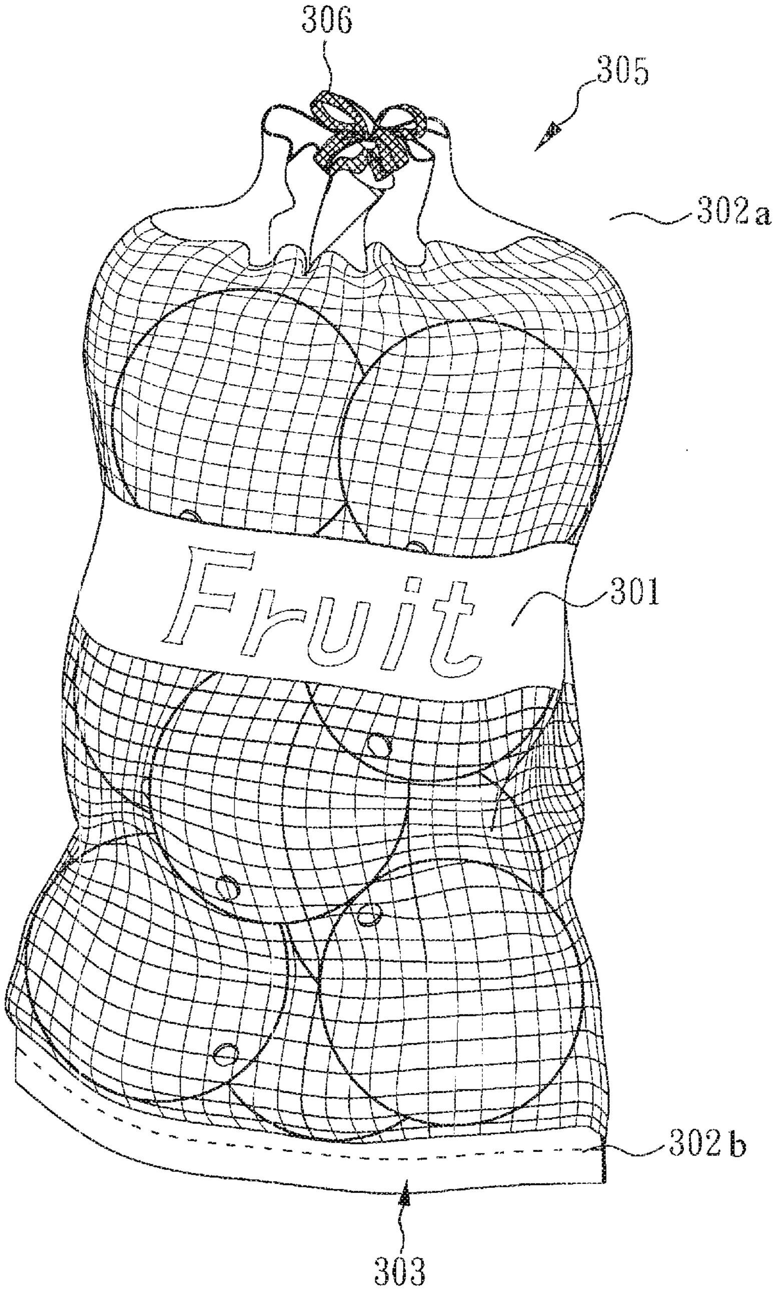
FIG. 8 is a schematic diagram illustrating a plastic tube mesh bag with a tie using a drawstring according to FIG. 7A and FIG. 7B.

FIG. 8 is a schematic diagram illustrating a plastic tube mesh bag 305 which is filled with fruit and tied up with the drawstring 306. The plastic tube mesh bag 305 includes a preprinted label 301, which is fixed on the mesh tube cloth, and a plastic film 302*a* on the upper edge and a plastic film 302*b* at the bottom edge. On the bottom edge, a line of stitches 303 is sewed across the mesh tube over the plastic film 302*b* to stitch two opposite sides of the mesh tube together. The plastic tube mesh bag 305 is closed or sealed by pulling and tying the drawstrings 306 on opposite sides of the plastic tube mesh bag 305. The plastic film 302*b* increases the strength of the sewing line and thus reduces the possibility that the bottom of the mesh bag is broken due to weight of the contained items.

Figure 9:
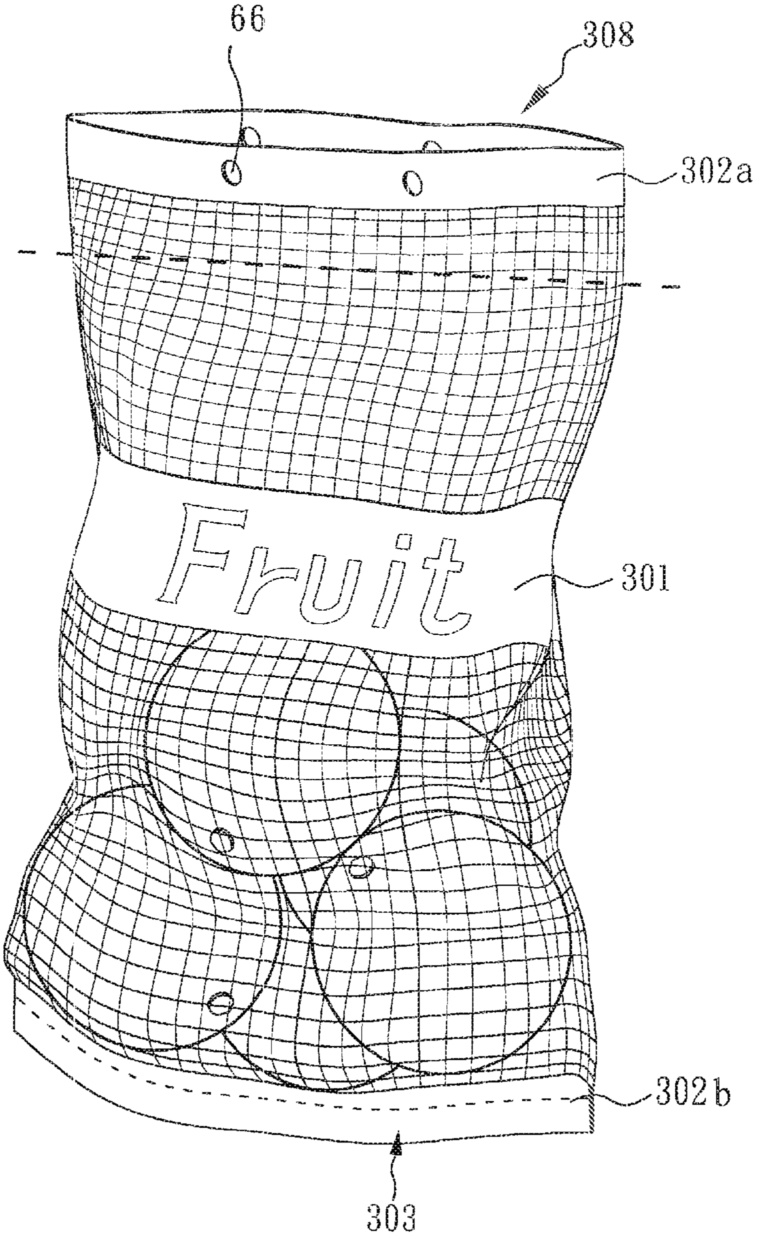
FIG. 9 is a schematic diagram illustrating a tube mesh bag which is made using the machine of FIG. 4, where a cut is made on each filmed section of the mesh tube and the tube mesh bag is made using a segment of the cut mesh tube with one end sealed with a line of stitches and with an open end strengthened with the plastic film which has two punched holes for placing the mesh bag in a packaging machine.

FIG. 9 is a schematic diagram of a plastic tube mesh bag 308 made the apparatus and process according to another embodiment of the present invention. For manufacturing this type of mesh bags, the hole punching assembly 38 was engaged. After the plastic films 302*a*/302*b* and the preprinted label 301 are attached to the mesh tube, two holes 66 are punched over the plastic film 302*a* on both sides of the mesh tube. In the repeated operation, the apparatus stitches across the mesh tube and then cut the mesh tube into mesh bags. The sewing line 303 shows the stitches over the plastic film 302*b*. The plastic film 302*b* increases the strength of the sewing line and thus reduces the possibility that the bottom of the mesh bag is destroyed due to the weight of the contained items.

Figure 10:
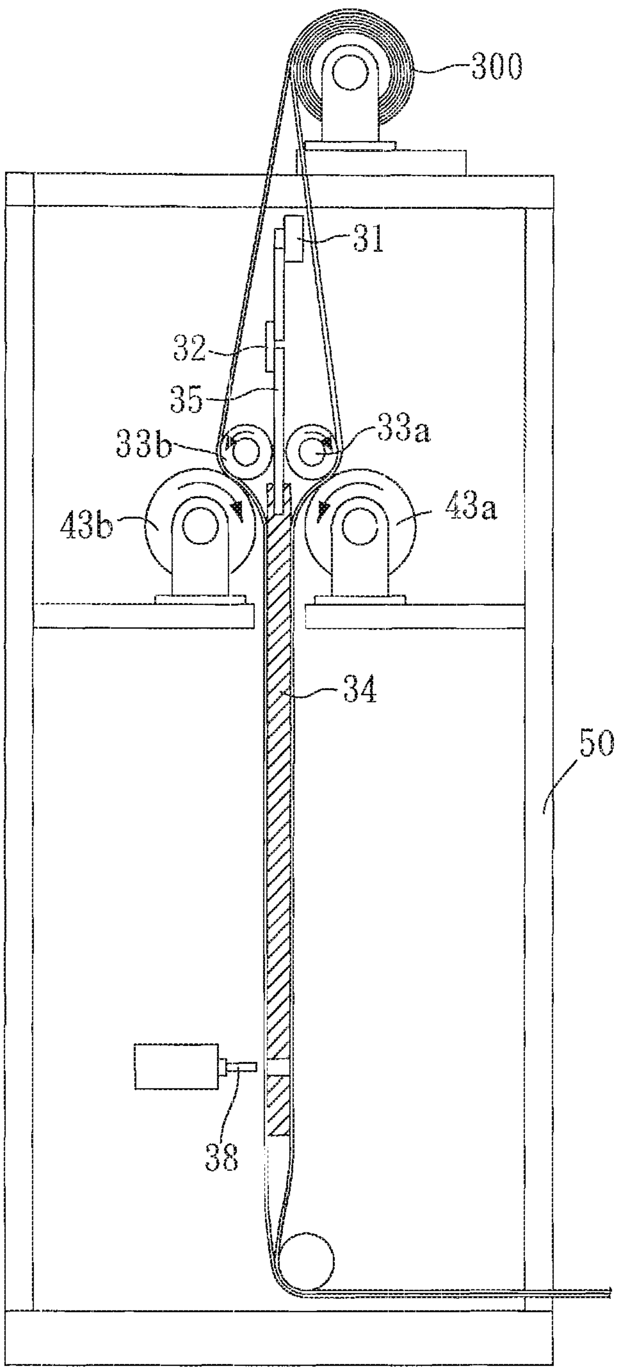
FIG. 10 is a schematic diagram of a cross sectional view of the mechanism for punching holes on the mesh tube which is implemented in a vertical position according to a typical embodiment of the present invention.

FIG. 10 is a schematic diagram illustrating a sectional view of the apparatus according to one embodiment of the present invention. The guiding assembly 30 of FIG. 3 is vertically implemented in the machine frame 50 by an operative coupling of a pair of rollers 33*a* and 33*b* with a pair of guiding rollers 43*a* and 43*b*. The rollers 33*a* and 33*b* are components of the guiding assembly 30. Yet the rollers 43*a* and 43*b* are integrated with or affixed to the machine frame 50. The rollers 33*a* and 33*b* support the partition plate 34 upright. In this implementation, both the label attaching assembly and the film attaching assembly are disengaged from operations. The mesh tube 300 passes between the roller 33*a* and the roller 43*a* in one side, and between the roller 33*b* and the roller 43*b* in another side. Note that the apparatus illustrated in FIG. 10 can be horizontally implemented. In such a horizontal implementation, the guiding assembly will be inserted into the mesh tube cloth 300 and then placed on a flat bed with various rollers which allow the mesh tube pass the guiding assembly with less sliding friction.

Figure 11:
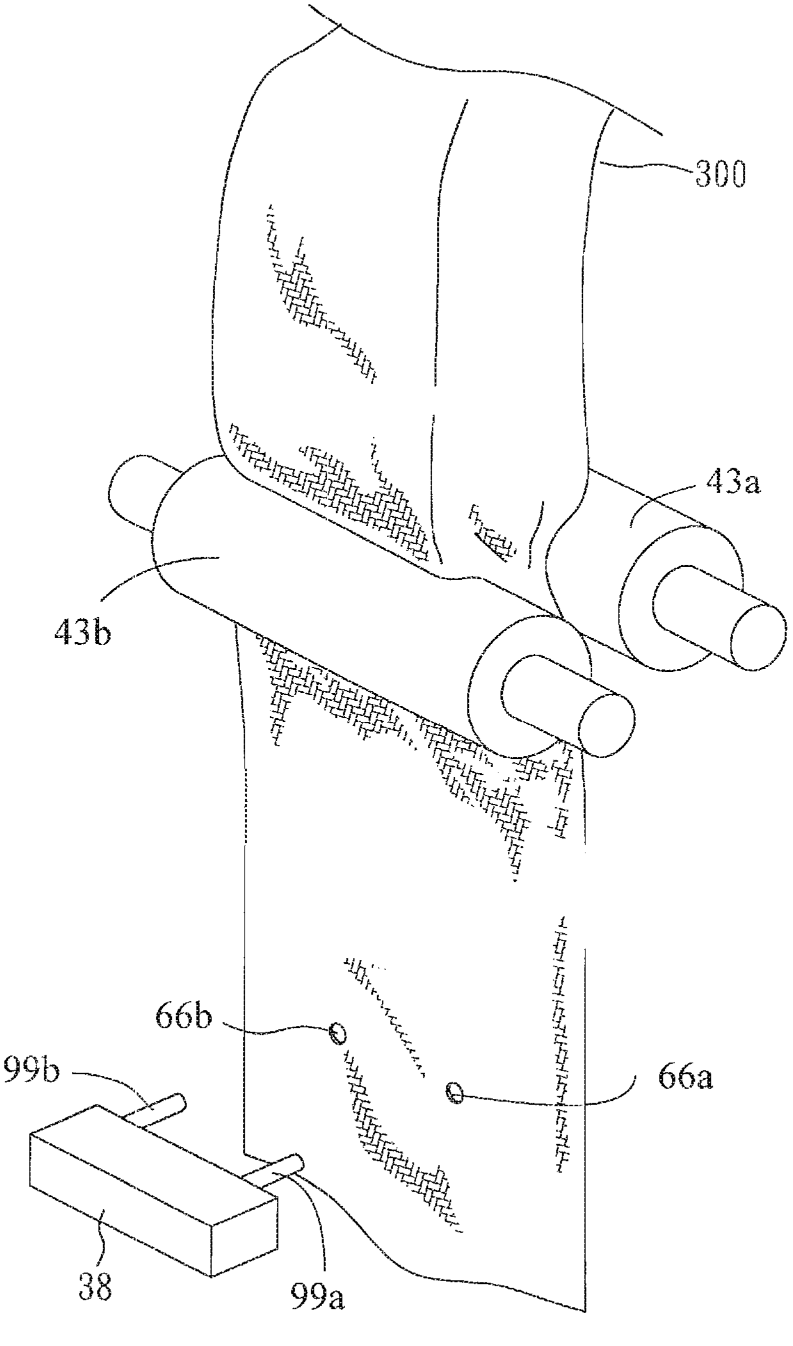
FIG. 11 is a schematic diagram further illustrating the mechanism for punching holes on the mesh tube according to FIG. 10.

FIG. 11 is a schematic diagram illustrating the operation of hole-punching on the continuous mesh tube 300. When the mesh tube is paused, the punching assembly 38 punches against the mesh tube to make the holes 66*a* and 66*b*. The hole-punchers 99*a* and 99*b* are heated to a certain temperature, such that when the hole-punchers 99*a*/99*b* are cutting the mesh tube or cutting the filmed mesh tube, the edge of the punched hole is heat-sealed.

Figure 12:
FIG. 12 is a schematic diagram illustrating a mesh tube made using the process and apparatus of FIG. 10 and FIG. 11.

FIG. 12 is a schematic diagram of a plastic tube mesh bag which is manufactured using the apparatus and process according to one embodiment of the present invention. Now refer back to FIG. 4 and FIG. 5. The mesh tube 300 is passing through the guiding assembly 30. The mesh tube 300 is separated by the partition plate 34. The punching assembly 38 punches holes on the plastic film 302 through the through-holes 39 on the partition plate 34. A pair of holes 66*a* and 66*b* is made on the plastic film 302 on the upper edge of the plastic tube mesh bag. Drawstrings can be inserted into the holes 66*a*/66*b* and can be used as a handle to the plastic tube mesh bag.

Figure 13:
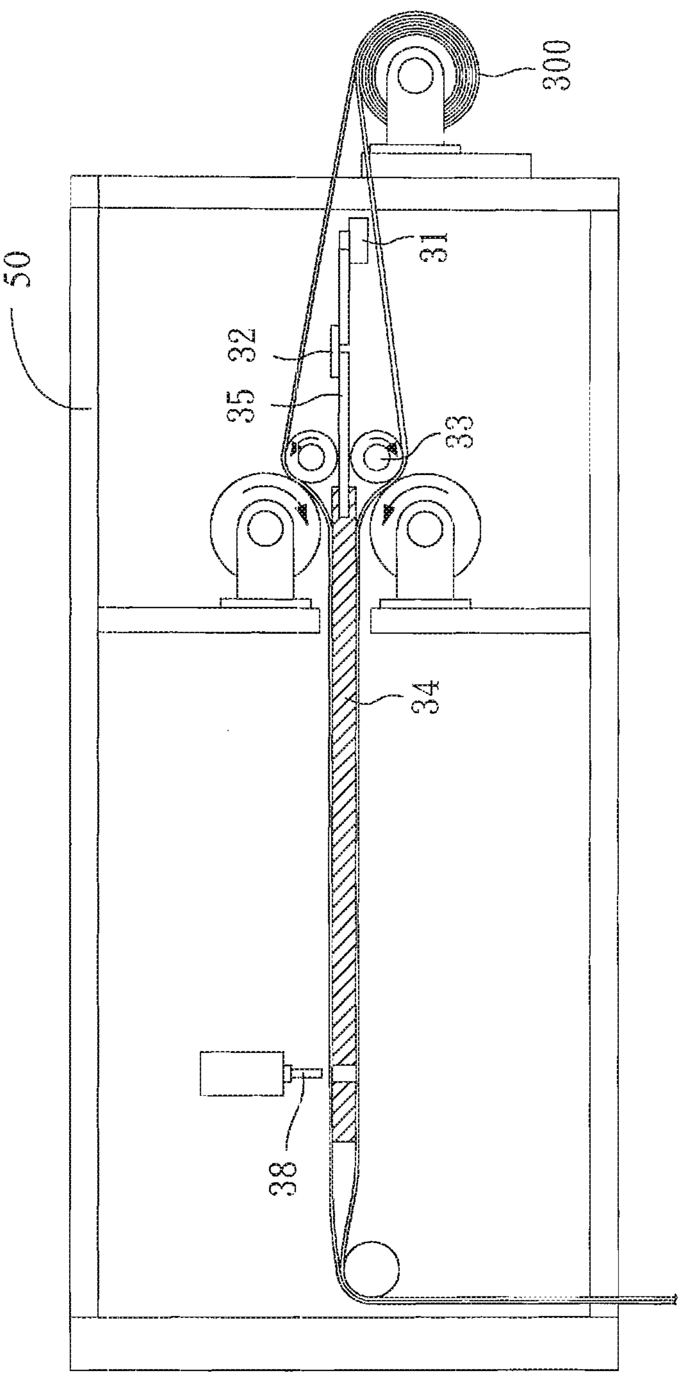
FIG. 13 is a schematic diagram of a cross sectional view of the mechanism for punching holes on the mesh tube which is implemented in a horizontal position according to another embodiment of the present invention.

FIG. 13 is a schematic diagram illustrating a sectional view of the apparatus according to another embodiment of the present invention. This embodiment is a horizontal implementation of the embodiment as illustrated in FIG. 10. The guiding assembly 30 is horizontally implemented in the machine frame 50 by an operative coupling of a pair of rollers 33*a* and 33*b* with a pair of rollers 43*a* and 43*b*. The rollers 33*a* and 33*b* are components of the guiding assembly 30. The rollers 43*a* and 43*b* are integrated with the machine frame 50. The rollers 33*a* and 33*b* support the partition plate 34 upright. The mesh tube 300 passes between the roller 33*a* and the roller 43*a* in one side, and between the roller 33*b* and the roller 43*b* in another side. In such a horizontal implementation, the guiding assembly will be inserted into the mesh tube cloth 300 and then placed on a flat bed with various rollers which allow the mesh tube pass the guiding assembly easily.

Figure 14:
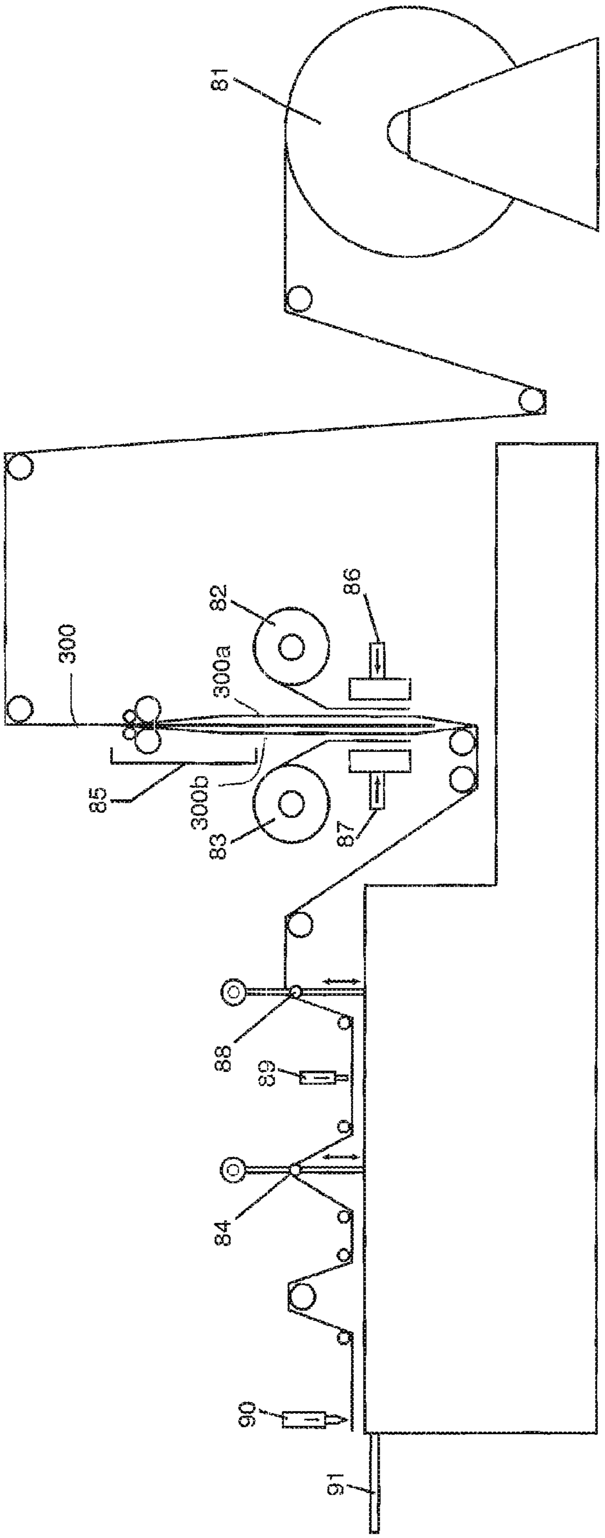
FIG. 14 is a schematic diagram of illustrating the apparatus and the process for making mesh bags from a role of mesh tube cloth according to a typical implementation of the present invention.

FIG. 14 is a schematic diagram of illustrating the machine assembly and the process for making mesh bags from a role of mesh tube cloth according to a typical implementation of the present invention. A role of mesh tube cloth 81 is transported through the passageway of the machine assembly. A dynamic guiding assembly 81, which is vertically coupled to the machine frame, separates the tube cloth 300 into two sides 300*a* and 300*b*. A role of plastic film 82 is to be attached to one side 300*a* of the mesh tube via a heat pressing means 86. Similarly, a role of plastic film 83 is to be attached to another side 300*b* of the mesh tube via a heat pressing means 87. The heat pressing means 86 and 87 are collectively called film attaching assembly. Then the mesh tube is transported to a length-adjustment roller 88 for adjusting the hole-punching distance. After the length adjustment, the hole-punching assembly 89 punches holes on the mesh tube. Then the mesh tube is transported to another length-adjustment roller 84 for adjusting the cutting distance. The mesh tube is then cut by the cutting assembly 90 into mesh bags which are organized in the collection support 91.

The process for manufacturing mesh bags from a roll of continuous mesh tube according to FIG. 14 includes the steps of:

Step 1: Transporting the continuous mesh tube through a mechanical passageway defined by a number of guiding rollers affixed to a machine frame, at least one of the guiding rollers being a motor-powered roller which drives the mesh tube's transportation;

Step 2: Placing a guiding assembly inside of the mesh tube from its open end, the guiding assembly having a partition plate, at least two adjustable arms for propping up the mesh tube, at least one free spinning support roller and a supporting member for coupling the partition plate, the propping arms and the free spinning support roller together, the guiding assembly being dynamically coupled in the passageway through rotating interaction between the free spinning support roller and at least one guiding roller, the guiding assembly separating the mesh tube into two opposite sides, one of which passing between the free spinning support roller and the at least one guiding roller;

Step 3: Pausing the mesh tube's transportation at predetermined intervals;

Step 4: Attaching a band of plastic film, by a film attaching assembly coupled to the machine frame, to a first portion of the mesh tube which is separated by the guiding assembly during the same paused interval with the label attaching step;

Step 5: Attaching a preprinted label, by a label attaching assembly coupled to the machine frame, to a second portion of the mesh tube which is separated by the guiding assembly during each paused interval or to a filmed portion from Step 4;

Step 6: Sewing a line of stitches across the filmed mesh tube;

Step 7: Cutting the sewed mesh tube into mesh bags.

The process may further include Step 8: Punching holes, by a hole-punching assembly coupled to the machine frame, on another filmed portion of the mesh tube, wherein the hole-punching assembly comprises a pair of male cylindrical members and a heating means for heating the cylindrical members, the cylindrical members being operable to be coupled into a pair of through-holes on the partition plate to make a pair of holes on both opposite sides of the mesh tube separated by the partition plate, the through-hole's diameter being slightly larger than the male member's diameter.

The hole-punching step can be performed immediately after the film attaching step during a same paused interval. The machine assembly can be configured that the filmed portion of the mesh tube was filmed by the film attaching assembly during a prior paused interval. Alternatively, the hole-punching step can be performed after the sewing step.

The process may further include Step 9: Sucking away fragments of the mesh tube from the hole-punching assembly's step using a pair of pipes, each of which being affixed at a position facing to one of the through-holes of the partition plate, the pipes being connected to a trash container.

As illustrated in the embodiments above, when applying the process of the present invention, the invention solves the problems that mesh cloth has loose edges after being cut and the problem of drawstring. In addition to attach the preprinted labels, the plastic films can be attached to the top and bottom of the plastic tube mesh bag with the apparatus of the present invention. This can prevent the loose ends at the edge and therefore reduce the cost of sealing the top of the bag. With the use of plastic films with drawstrings, the drawstrings can be attached to the top of the plastic tube mesh bag, thus reduces enormous labor and cost.

While one or more embodiments of the present invention have been illustrated in detail, the skilled artisan will appreciate that modifications and adoptions to those embodiments may be made without departing from the scope and spirit of the present invention as set forth in the following claims.

The invention claimed is:

1. A process for manufacturing mesh bags from a roll of continuous mesh tube comprising the steps of:

transporting the mesh tube through a mechanical passageway defined by a number of guiding rollers affixed to a machine frame, at least one of said guiding rollers being a motor-powered roller which drives the mesh tube's transportation;

placing a guiding assembly inside of the mesh tube from its open end, said guiding assembly comprising a partition plate, at least two adjustable arms for propping up the mesh tube, at least one free spinning support roller and a supporting member for coupling said partition plate, said propping arms and said free spinning support roller together, said guiding assembly being dynamically coupled in said passageway through rotating interaction between said free spinning support roller and at least one said guiding roller, said guiding assembly separating the mesh tube into two opposite sides, one of which passing between said free spinning support roller and said at least one guiding roller;

pausing the mesh tube's transportation at predetermined intervals;

attaching a band of plastic film, by a film attaching assembly coupled to the machine frame, to a first portion of the mesh tube which is separated by said guiding assembly during the same paused interval with said label attaching step;

attaching a preprinted label, by a label attaching assembly coupled to the machine frame, to a second portion of the mesh tube which is separated by said guiding assembly during each paused interval or to a filmed portion;

sewing a line of stitches across the filmed mesh tube; and cutting the sewed mesh tube into mesh bags.

2. The process of claim 1, further comprising the step of:

punching holes, by a hole-punching assembly coupled to the machine frame, on another filmed portion of the mesh tube, wherein said hole-punching assembly comprises a pair of male cylindrical members and a heating means for heating said cylindrical members, said cylindrical members being operable to be coupled into a pair of through-holes on said partition plate to make a pair of holes on both opposite sides of the mesh tube separated by said partition plate, said through-hole's diameter being slightly larger than said male member's diameter.

3. The process of claim 2, wherein said hole punching step is performed immediately after said film attaching step during a same paused interval.

4. The process of claim 2, wherein said filmed portion of the mesh tube was filmed by said film attaching assembly during a prior paused interval.

5. The process of claim 2, wherein said hole punching step is performed after said sewing step.

6. The process of claim 1, wherein said band of plastic film can be any of:

a section of plastic film tube;

a section of plastic film tube including a drawstring therein; and a section of plastic film tube including a drawstring therein, said film tube being partially carved such that said drawstring is partially exposed.

7. The process of claim 1, wherein said guiding assembly is horizontally coupled in said passageway such that the mesh tube moves horizontally over said guiding assembly.

8. The process of claim 1, wherein said guiding assembly is vertically coupled in said passageway such that the mesh tube moves downwardly over said guiding assembly.

9. The process of claim 1, wherein each of said adjustable arms has a bearing coupled to its upper end to decrease sliding friction between the mesh tube and said adjustable arm, and each of said adjustable arms is elastically extended by at least one spring.

10. The process of claim 2, further comprising the step of:

sucking away fragments of the mesh tube from said hole-punching assembly's step using a pair of pipes, each of which being affixed at a position facing to one of said through-holes of said partition plate, said pipes being connected to a trash container.

* * * * *